US006950464B1

(12) United States Patent
Shen et al.

(10) Patent No.: US 6,950,464 B1
(45) Date of Patent: Sep. 27, 2005

(54) SUB-PICTURE LEVEL PASS THROUGH

(75) Inventors: Jiandong Shen, Santa Clara, CA (US); Shan Zhu, San Jose, CA (US); David Arnstein, Fremont, CA (US); Pierre Seigneurbieux, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 591 days.

(21) Appl. No.: 10/034,159

(22) Filed: Dec. 26, 2001

(51) Int. Cl.[7] .............................................. H04N 07/18

(52) U.S. Cl. .............................. 375/240.03; 375/240.04

(58) Field of Search ........................ 375/240.02–240.07

(56) References Cited

U.S. PATENT DOCUMENTS

| | | | | |
|---|---|---|---|---|
| 5,963,260 A | * | 10/1999 | Bakhmutsky | 375/240.24 |
| 6,181,711 B1 | | 1/2001 | Zhang et al. | |
| 6,507,618 B1 | * | 1/2003 | Wee et al. | 375/240.16 |
| 6,577,679 B1 | * | 6/2003 | Apostolopoulos | 375/240.12 |
| 6,650,705 B1 | * | 11/2003 | Vetro et al. | 375/240.08 |
| 6,711,212 B1 | * | 3/2004 | Lin | 375/240.24 |

OTHER PUBLICATIONS

ISO/IEP "Information Technology-Generic coding Of Moving Pictures And Associated Audio: Systems", ISO/IEC 13818-1, Nov. 13, 1994, 135 pages.
ISO/IEP "Information Technology-Generic Coding Of Moving Pictures And Associated Audio Information: Video", ISO/IEC 13818-2, 1995, 209 pages.

* cited by examiner

*Primary Examiner*—Andy Rao
(74) *Attorney, Agent, or Firm*—Beyer Weaver & Thomas LLP

(57) ABSTRACT

The invention described herein improves and expedites compressed video data delivery by providing systems and methods for transcoding and pass through on a sub-picture level. For example, in MPEG embodiments described herein, transcoding and compressed video data pass through may occur on a macroblock or slice level. This permits portions of a picture that need no rate reduction to be passed through without transcoding. The invention may also implement pass through on a picture by picture basis. Accordingly, the invention may determine transcoding or pass through for each picture or picture subregion. Thus, systems and methods described herein provide flexible compressed video data transcoding and pass through, as determined by varying bit rate demands of compressed video data transmission.

27 Claims, 7 Drawing Sheets

SUB-PICTURE LEVEL PASS THROUGH

BACKGROUND OF THE INVENTION

The present invention relates generally to systems and methods for transmitting data. More specifically, the present invention relates to systems and methods for compressed video data passthrough at finer levels of granularity and higher computational speed.

Video services are provided by a wide array of video content suppliers. For example, residential digital video services may include digital television, video on demand, Internet video, etc.—each service having hundreds of programs. A program refers to one or more bitstreams that are used to represent the video content and associated audio content. A target receiver for the programs, such as a set-top box (STB) located in a residential home, receives video programs from a number of different video content suppliers via one or more transmission channels.

There are presently a variety of different communication channels for transmitting or transporting video data. For example, communication channels such as coaxial cable distribution networks, digital subscriber loop (DSL) access networks, ATM networks, satellite, terrestrial, or wireless digital transmission facilities are all well known. In fact, many standards have been developed for transmitting data on the communication channels. For the purposes herein, a channel is defined broadly as a connection facility to convey properly formatted digital information from one point to another. A channel includes some or all of the following elements: 1) physical devices that generate and receive the signals (modulator/demodulator); 2) medium that carries the actual signals; 3) mathematical schemes used to encode and decode the signals; 4) proper communication protocols used to establish, maintain and manage the connection created by the channel 5) storage systems used to store the signals such as magnetic tapes and optical disks. The concept of a channel includes but is not limited to a physical channel, but also logical connections established on top of different network protocols, such as xDSL, ATM, IP, wireless, HFC, coaxial cable, Ethernet, Token Ring, etc.

The channel is used to transport a bitstream, or a continuous sequence of binary bits used to digitally represent video, audio and/or general data. A bit rate is the number of bits per second that is required to transport the bitstream. A bit error rate is the statistical ratio between the number of bits in error due to transmission and the total number of bits transmitted. A channel capacity is the maximum bit rate at which a given channel can convey digital information with a bit error rate no more than a given value.

Since transmission of video data with existing communication channels is often excessive, compression is an approach that has been used to make digital video images more transportable. Digital video compression allows digitized video data to be represented in a much more efficient manner and makes it possible to transmit the compressed video data using a channel at a fraction of the bandwidth required to transmit the uncompressed video data. International standards have been created for video compression schemes. These include MPEG-1, MPEG-2, MPEG-4, H.261, H.262, H.263, H.263+, etc. These standardized compression schemes rely on several algorithm schemes such as motion compensation, transform coding (for example, DCT transforms or wavelet/sub-band transforms), quantization of the transform coefficients, and variable length coding (VLC).

Despite the bit rate savings achieved by compression, video data is still frequently altered during transmission. Transcoding refers to altering data or information in a bitstream without changing the format of the bitstream. When desirable, transcoding reduces the bit rate of the compressed video data. Thus, after transcoding, the new bit rate for the compressed video data is smaller than the original bit rate.

One drawback of compression is increased difficulty in data manipulation and handling during transmission. As a result of the compression structure, transcoding is currently done on a picture by picture basis. When bit rate reduction is desired, some pictures are transcoded, others are passed through with no alteration or rate reduction. Since some pictures are not transcoded, the other pictures are transcoded more aggressively to compensate. Unfortunately, this forces a large and unproportional amount of rate reduction on a limited set of pictures. This unequal transcoding between pictures may lead to picture quality degradation, such as a 'beating effect' due to the uneven quantization between consecutive frames. Here, the viewer can undesirably perceive significant changes in video quality between frames.

In addition, picture based pass through and transcoding cannot handle portions of pictures requiring no rate-reduction, but included in a picture that is selected for transcoding. These portions of the pictures may comprise a significant fraction of a picture. Unnecessary transcoding in this manner will waste the computation cycles and may also lead to further diminished video output quality.

Based on the foregoing, improved methods and systems for transmitting video data would be desirable.

SUMMARY OF THE INVENTION

The present invention improves and expedites compressed video data delivery by providing systems and methods for transcoding and pass through on a sub-picture level. For example, in MPEG embodiments described herein, transcoding and compressed video data pass through may occur on a macroblock or slice level. This permits portions of a picture that need no rate reduction to be passed through without transcoding. The present invention may also implement pass through on a picture by picture basis. Accordingly, the present invention may determine transcoding or pass through for each picture or picture subregion. Thus, systems and methods of the present invention provide flexible compressed video data transcoding and pass through, as determined by varying bit rate demands of compressed video data transmission.

In one aspect, the present invention relates to a network device for transmitting compressed video data onto a channel. The network device comprises a processing apparatus designed or configured to locate macroblock boundaries in the compressed video data. The network device also comprises a rate controller designed or configured to selectively pass through macroblock data in the compressed video data. The network device further comprises a transmitting network interface designed or configured to transmit the compressed video data onto the channel.

In another aspect, the present invention relates to a method for transmitting compressed video data over a channel. The method comprises receiving a bitstream including the compressed video data. The method also comprises locating macroblock boundaries in the compressed video data. The method further comprises selectively passing through macroblock data in the compressed video data defined by the macroblock boundaries. The method additionally comprises transmitting the compressed video data onto the channel.

In yet another aspect, the present invention relates to a network device for transmitting compressed video data onto a channel. The network device comprises a processing apparatus designed or configured to locate picture subregion boundaries in the compressed video data. The network device also comprises a rate controller designed or configured to selectively pass through picture subregions in the compressed video data. The network device further comprises a transmitting network interface designed or configured to output the compressed video data onto the channel.

In still another aspect, the present invention relates to a method for transmitting compressed video data over a channel. The method comprises receiving a bitstream including the compressed video data. The method also comprises locating picture subregion boundaries in the compressed video data. The method further comprises selectively passing through picture subregions in the compressed video data. The method additionally comprises transmitting the compressed video data onto the channel.

In another aspect, the present invention relates to a network device for transmitting compressed video data over a channel. The system comprises means for receiving a bitstream including the compressed video data. The system also comprises means for locating macroblock boundaries in the compressed video data. The system further comprises means for selectively passing through macroblock data in the compressed video data defined by the macroblock boundaries. The system additionally comprises means for transmitting the compressed video data onto the channel.

In yet another aspect, the present invention relates to a computer readable medium including instructions for transmitting compressed video data over a channel. The instructions comprise instructions for receiving a bitstream including the compressed video data. The instructions also comprise instructions for locating macroblock boundaries in the compressed video data. The instructions further comprise instructions for selectively passing through macroblock data in the compressed video data defined by the macroblock boundaries. The instructions additionally comprise instructions for transmitting the compressed video data onto the channel.

These and other features and advantages of the present invention will be described in the following description of the invention and associated figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
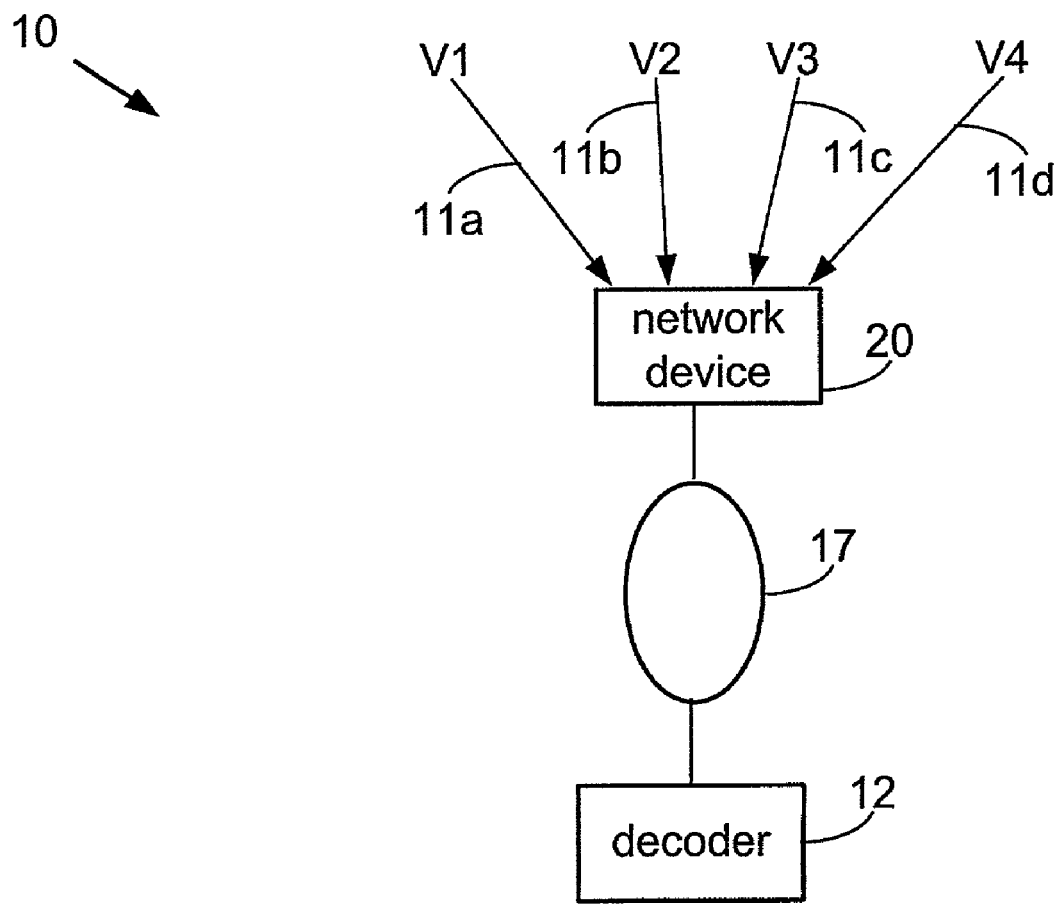
FIG. 1 illustrates an exemplary network system for transmitting compressed video data.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

In one aspect, the present invention implements flexible pass through methods that selectively pass through compressed video data on a picture or sub picture basis. As the term is used herein, pass through refers to direct copying of data from one location to another. In a specific embodiment, video data is directly copied from an input buffer that receives and temporarily stores incoming compressed video data to an output buffer that temporarily stores the data before transmission. When necessary, the network device may also implement bit rate conversion to facilitate transmission of compressed video data onto a limited capacity channel.

The present invention is particularly useful for pass through of video data compressed according to an MPEG standard. Compression according to the MPEG-2 standard will first be briefly described in order to facilitate the following description of one embodiment of the present invention. While the present invention will now primarily be described in terms of compression information relevant to the MPEG-2 standards, the present invention may be useful to other video compression and packaging schemes. Other compression standards suitable for use with the present invention may include any MPEG-X compression, H.26X compression for video conferencing, compression using proprietary video stream formats, or any other compression formats that compress data on a sub-picture level.

The MPEG-2 compression standard consists of several layers including a system layer and an elementary stream layer. The MPEG-2 standard on Systems defines two data stream formats: a Transport Stream and a Program Stream. The Transport Stream can carry multiple programs simultaneously, and is optimized for use in applications where data loss may be likely, such as transmission of video and audio over coaxial cable television networks, fiber and satellite transponders. The Program Stream is optimized for multimedia applications, for performing systems processing in software, and for MPEG-1 compatibility. It is suitable for use in error-free environments such as when the compressed data are stored on a disk. The Transport Stream and Program Stream are built on a common Packetized Elementary Stream (PES) packet structure, facilitating common video and audio decoder implementations and stream type conversions.

The Elementary Stream (ES) is a generic term for one of the coded video, coded audio or other coded bit streams carried in the packetized elementary stream (PES) packets. The video elementary stream defines how compressed video data signals are to be decoded by using different variable length coding (VLC) tables, inverse scanned, inverse quantized, inverse discrete cosine transformed (IDCT), motion compensated and presented in the right order of pictures. The elementary stream layer contains the coded picture data. The basic structure for the coded picture data is a macroblock which comprises a 16 pixel by 16 pixel array. Macro blocks are the basis for motion compensation and variable length coding, while a macro block is further divided into four equal-sized 8 pixel by 8 pixel arrays of samples called blocks. Multiple macroblocks form a slice. A coded picture consists of one or multiple slices. Multiple coded pictures form a group of pictures. One or more groups of pictures form a sequence. Such hierarchical layering of data structures allows pass through according to one embodiment of the present invention to occur on various levels.

The structure of an MPEG bit stream is well-known to one of skill in the art and is described by the MPEG standards. The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818; "Generic coding of moving pictures and associated audio information", November 1994, which is herein incorporated by reference.

Referring now to FIG. 1, an exemplary system 10 where pass through techniques in accordance with the present invention is particularly useful will be described. System 10 is responsible for transmitting compressed video data from multiple bitstreams 11a–d to a target decoder 12. Bitstreams 11a–d include compressed video data corresponding to video programs V1, V2, V3, and V4.

Network device 20 transmits compressed video data from programs V1, V2, V3, and V4. For each bitstream, network device 20 may implement rate control to make bitstream bandwidth demand meet channel bandwidth availability. For real time video delivery applications, after rate control makes bitstream bandwidth demand meet channel bandwidth availability by performing rate reduction, a scheduler transmits the requested video data to guarantee no underflow of the downstream decoder 12 video buffer. In one embodiment, the scheduler combines video data from bitstreams 11a–d to form a multiplex.

In some cases, such as within a telco environment, network device 20 is aware of the video content requests of a target decoder that it transmits to and the available bandwidth therebetween. Alternatively, e.g., in some cable environments, the network device 20 broadcasts multiple multiplexed video programs without specific requests from end user receivers. In some cable distribution networks, all compressed signals and programs are transmitted via network device 20 through local networks and then to the decoders. Network device 20 and the local networks together form a distribution network for the compressed signals. In one exemplary cable distribution network, network device 20 is a so-called "super head-end" facility that feeds multiple multiplexed video programs to smaller regional head-ends within local networks via fiber optical networks (such as SONET or DWDM based networks). Each regional head-end in turn is connected to its own population of target decoders, i.e., multiple decoders like 12 are usually connected to a single regional head-end. In a typical telco scenario for example, the regional head-ends are telco central offices each connecting to a large number decoder/receivers via twisted phone wires (DSL).

Target decoder 12 receives compressed video data from network device 20 through a local network 17. Local network 17 is included in a larger network that also includes other local networks, which service other target decoders. In one embodiment, network device 20 is a headend and local network 17 corresponds to a geographic service area of a cable network serviced by the headed. Decoder 12 may then correspond to a decoder included in a set-top box or personal computer located in a residential home. Decoder 12 decompresses the compressed video data into an uncompressed format for visual output to the user.

Figure 2:
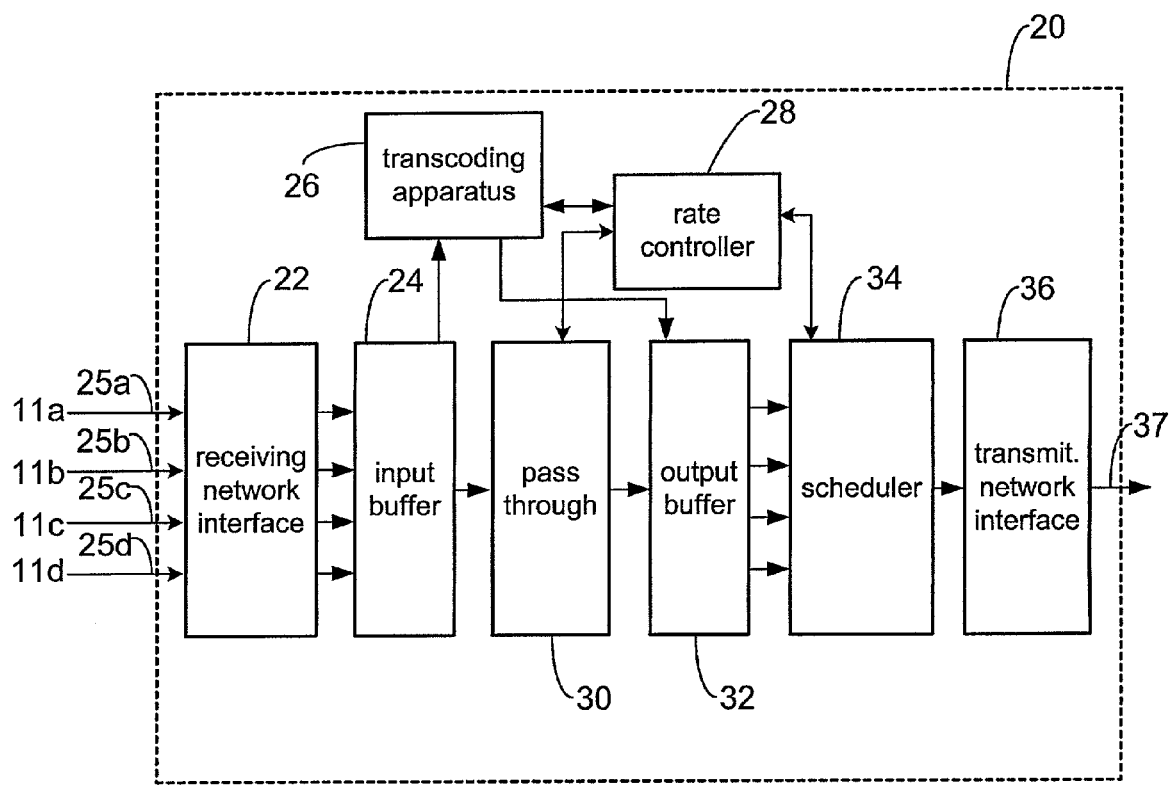
FIG. 2 is a block diagram of the network device included in the system of FIG. 1 in accordance with one embodiment of the present invention.

FIG. 2 is a block diagram of network device 20 of FIG. 1, which provides bitstreams including compressed video data, in accordance with one embodiment of the present invention. While the present invention will now be described as an apparatus composed of units, those skilled in the area will recognize that the present invention encompasses a method, process or software having as steps the actions performed by each unit and described below.

Network device 20 comprises: receiving network interface 22, input buffer 24, transcoding apparatus 26, rate controller 28, pass through apparatus 30, output buffer 32, scheduler 34, and transmitting network interface 36. As one of skill in the art will appreciate, each of the structures of network device 20 may be a single hardware and/or software structure, multiple hardware and/or software structures, or combined in a more simple apparatus scheme. For example, although input buffer 24 and output buffer 32 are shown as single units, it is understood that each of these may include multiple buffers, each capable of storing separate bitstreams.

Receiving network interface 22 has a plurality of input lines 25a–d that receive bitstreams 11a–d from a variety of sources using suitable receiving components. For example, input line 25a is coupled to a satellite receiver that receives compressed video data from a satellite based communication system. Input line 25b receives compressed video data from an Internet network including a series of ATM based routers which route the compressed video data to network device 20. Input line 25c is coupled to a receiver that receives compressed video data from a terrestrial source and network interface 22 may also include a suitable frequency demodulation and descrambling facilities. Line 25d receives compressed video data from an Internet network using IP protocol that routes a compressed bitstream from a video streaming server to the network device 20. The compressed video data as received is provided to input buffer 24.

Input buffer 24 temporarily stores compressed video data received from network interface 22 until processed by transcoding apparatus 26 or pass through apparatus 30.

Pass through apparatus 30 comprises an input line coupled to an output of input buffer 24, an input line from rate controller 40, and an output line coupled to the input of output buffer 32. Pass through apparatus 30 selectively passes through video data from input buffer 24 to output buffer 32, as will be described in further detail below. Pass through apparatus 30 may also include facilities to parse compressed video data and perform various functions associated with pass through on a picture or sub-picture level, as appropriate. Compressed video data from pass through apparatus 30 is provided to output buffer 32.

When necessary, transcoding apparatus 26 alters video data in one or more of the incoming bitstreams. When desirable, the network device 20 reduces the bit rate of compressed video data transmitted based on the channel capacity of the channel between the network device 20 and the target decoder. Bit rate conversion of a bitstream refers to the process performed on compressed video data that results in a different transmission bit rate than the originally compressed video data. In a typical scenario, the new bit rate for output bitstream 37 is smaller than the original bit rate of its associated input bitstream, but sometimes the resulting bit rate can also be greater than the original bit rates.

Each of bitstreams may be bit rate converted by transcoding apparatus 26 according to traffic shaping techniques. In some transrating applications using network device 20, such as statistical re-multiplexing, the required bit rate reduction is typically small, e.g., in the range of 5 to 15%. Here, transcoding apparatus 26 transcodes compressed video data on one of a macroblock level, slice level (as will be described in further detail below), or picture level, using for example, re-quantization as described with respect to FIG. 6. In other video delivery scenarios, output bitstream 37 is delivered to different transmission channels each having a different channel capacity using more aggressive transcoding techniques than those used for traffic shaping, and the bit rate may be tailored accordingly for each channel. By way of example, two bitstreams received at 4 Mbps and 2 Mbps (total input=6 Mbps) may be combined and bit rate converted to a multiplexed transmission bitstream of 3 Mbps for a channel capable of delivering only 3 Mbps.

The data and bit rate conversion process is intended to remove bits from the compressed bitstreams so that the new bitstreams are still compliant to the given compression syntax, and can be decoded by a receiver, albeit at a possibly lower quality than the originally compressed bitstream. Some suitable transcoding techniques that may be implemented by transcoding apparatus 26 on compressed video data include thresholding, re-quantization (see FIG. 6), motion compensation with motion vector reuse, and complete re-encoding, for example. One of skill in the art is aware of suitable transcoding techniques, and these techniques are not detailed herein for sake of brevity. Bit rate conversion of a compressed bitstream is further described in commonly owned U.S. Pat. No. 6,181,711, which is incorporated by reference herein for all purposes.

Rate controller 28 operably connects to both transcoding apparatus 26, scheduler 34, and pass through apparatus 30, and determines what bit rate is to be used for video data transmitted from network device 20. More specifically, based on messages received from rate controller 28, transcoding apparatus 34 adjusts the bit rate of compressed video data accordingly. Rate controller 28 may rely on information regarding the channel that output bitstream 37 is transmitted onto. For example, rate controller 28 maybe configured to receive a rate value from an RADSL transmitter in an ADSL embodiment or to receive a rate value from an ATM network in an ATM environment. A control signal is provided by the rate controller 28 to transcoding apparatus 26 and/or pass through apparatus 30. The control signal specifies what data to pass through and the amount of modifying transcoding apparatus 26 performs to achieve the desired output bit rate from network device 20. Since transcoding and pass through of compressed video data within network device 20 may occur on a macroblock level, slice level (as will be described in further detail below), or picture level, messages from rate controller 28 may specify the amount of modifying on each of these levels. The output of transcoding apparatus 26 is provided to output buffer 32.

Output buffer 32 temporarily stores compressed video data received from transcoding apparatus 26 and pass through apparatus 30 until processed by scheduler 34.

Scheduler 34 includes at least one input coupled to output buffer 32, an input coupled to rate controller 28, and an output coupled to transmitting network interface 36. Scheduler 34 selectively combines packets including compressed video data, and in some cases forms a multiplexed bitstream. Scheduler 34 may also insert any headers, stuffing bits, filler packets as appropriate. Thus, after rate controller 28 makes bitstream bandwidth demand meet channel bandwidth availability by performing rate reduction, scheduler 34 distributes the channel bandwidth between the compressed video data of bitstreams 11a–d to guarantee no underflow of the downstream decoder video buffers. If output buffer 32 comprises multiple buffers, scheduler 34 determines the relative order of data transmission from the individual buffers. In one embodiment, scheduler 34 outputs a multiplexed bitstream including compressed video data from bitstreams 11a–d that has a substantially constant bit rate.

In a specific embodiment, scheduler 34 and rate controller 28 are included in a multiplexer, such as a statistical multiplexer. A statistical multiplexer is a multiplexer that takes advantages of the statistical behavior of video data to minimize the total bandwidth usage of video data from multiple bitstreams. More specifically, the statistical multiplexer takes advantage of the variable bit rate (VBR) nature of multiple bitstreams comprising compressed video data. In some cases, when scheduler 34 combines multiple bitstreams, the bit rate of each incoming VBR bitstream may be adjusted but the total bit rate of the output multiplexed compressed bitstream 37 is kept at a substantially constant value. When a statistical multiplexer combines multiple bitstreams, an algorithm may be used to adapt the bit rate of each VBR video signal but the total bit rate of the output multiplex is kept at a substantially constant value.

The output of scheduler 34 is provided to transmitting network interface 36, which is configured to transmit the output bitstream 37 including any transcoded compressed video data onto a suitable channel. Network interface 36 has a plurality of output lines that transmit bitstreams to a variety of sources using suitable transmitting components. For example, network interface 36 may comprise a transmitter known in the art for DSL networks. Network interface 36 may also comprise a transmitter known in the art for IP networks, for example. In a specific embodiment, the output medium is an Internet network where network interface 36 transmits through a series of nodes, which route the multiplexed bitstream to a suitable receiver. Network interface 36 may also comprise a transmitter known in the art for ATM networks, for example. In a specific embodiment, the output medium is an Internet network where network interface 36 transmits through a series of ATM based routers which route the MPEG-2 compressed video data to a suitable receiver. The output of network interface 36 forms the output 37 of network device 20. Although network interface 22 and network interface 36 are shown as separate structures, it is understood that network device 20 may implement a single or combined network interface capable of acting as both the receiving network interface 22 and transmitting network interface 36.

When possible, the present invention passes through compressed video data that does not require transcoding. For MPEG compressed video data, the pass through may occur on a picture basis or on a sub-picture basis—namely—on a macroblock or slice basis. Passing through data in this manner allows network device 20 to flexibly minimize the amount of unnecessary transcoding in excess of the minimum transcoding needed to fit the compressed video data within the available bandwidth, while saving computation cycles when transcoding is needed.

Figure 3:
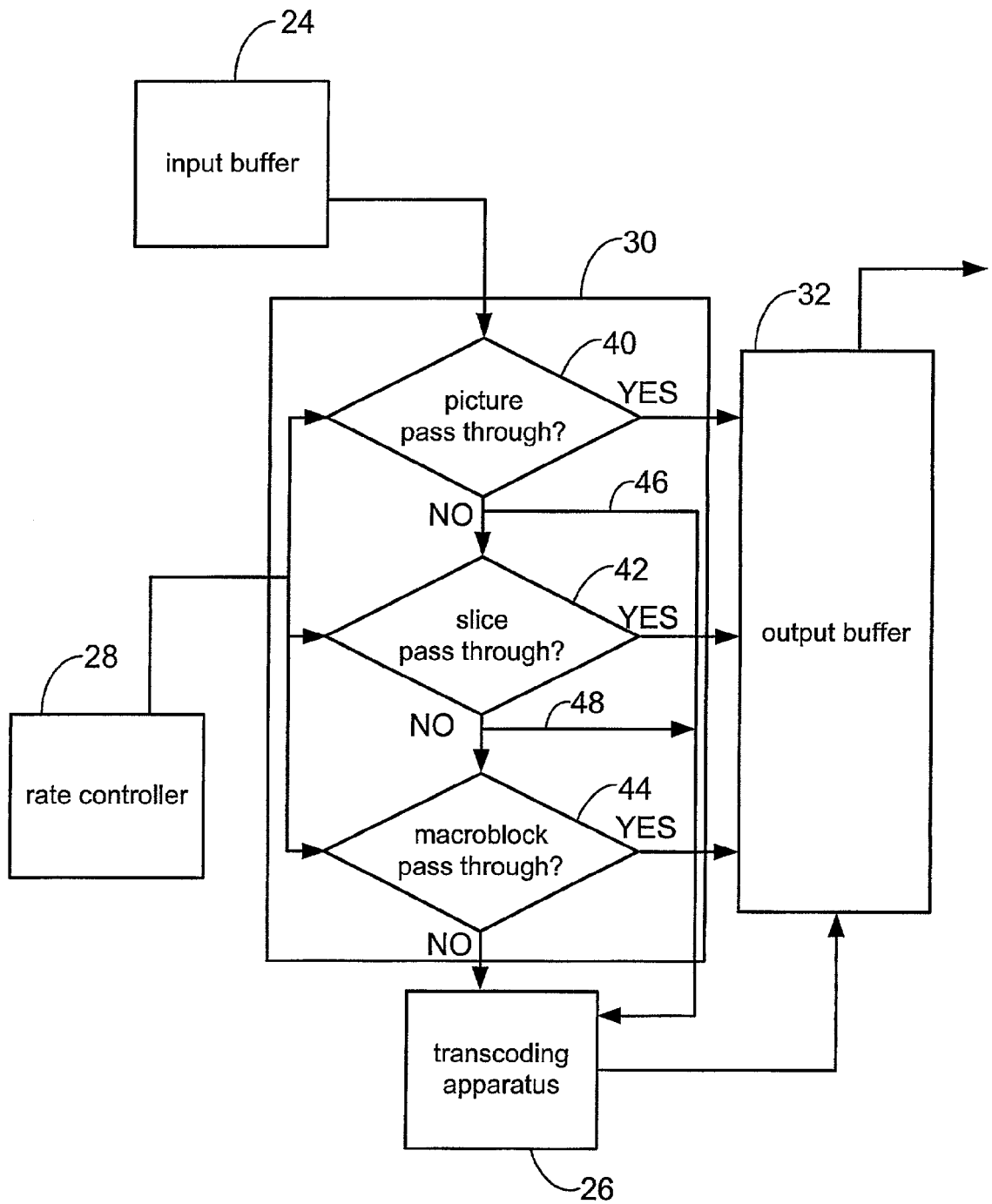
FIG. 3 illustrates pass through processing within the network device of FIG. 1 in accordance with a specific embodiment of the present invention.

FIG. 3 illustrates pass through processing within network device 20 in accordance with a specific embodiment of the present invention. Input buffer 24 temporarily stores compressed video data until processed by pass through apparatus 30. As shown, pass through apparatus 30 comprises picture pass through 40, slice pass through 42, and macroblock pass through 44. Based on a control signal from rate controller 28, compressed video data from input buffer 24 may either be block copied by picture pass through 40, slice pass through 42, macroblock pass through 44, or transcoded using transcoding apparatus 26, before being sent to output buffer 32.

Picture pass through 40 is well suited for use with compressed video data when the number of bits for an entire picture fit within the allowable bandwidth and no transcoding is required for compressed video data in the picture. When picture pass through 40 receives a signal from rate controller 29 to this effect, picture pass through 40 directly copies picture data for the current picture from buffer 24 to output buffer 32. To locate the boundaries for data copy, pass through apparatus 30 may parse the bitstream and locate the picture start codes for the current picture and next picture as they are found in each picture header. Picture pass through 40 may significantly speed data transmission using network device 20 since these synchronization bits are easily located in the compressed bitstream.

If the compressed video data is not passed through, it may be transcoded on a picture basis (46), wherein the selective passing through proposed by this invention and as mentioned below is not used. For example, the picture data may be re-quantized as described with respect to FIG. 6.

Slice pass block 42 receives a signal from rate controller 28 that indicates whether each slice in the picture will be passed through, transcoded, or sent to macroblock pass through 44. In some cases, slice pass block 86 may not be implemented within pass through apparatus 30 and compressed video data is processed using only picture pass through 40, macroblock pass through 44, and transcoding apparatus 26.

Slice pass block 42 is well suited for use when the compressed video data in a picture does not fit within the available bandwidth and transcoding on subregions of the picture are required. Pass through using slice pass block 42 allows relatively simple direct copying of compressed video data from input buffer 24 to output buffer 32 since synchronization code in an MPEG compressed bitstream will clearly delineate the start and end of each slice. The start code for each slice is found in the slice header. Each slice in a picture is uniquely identified through a different start code in its slice header. The start code for consecutive slices may then be used as the beginning and end reference points for block copying of compressed video data.

Slice data may also be transcoded (48), if the macro block level passing through proposed by this invention and mentioned below is not used. For example, the slice data may be re-quantized as described with respect to FIG. 6. While not as dramatic or noticeable as quantization based beating effects that may be produced using picture level pass through, slice level transcoding may also produce unequal quantization between slices. To minimize degraded visual output and increase granularity of any transcoding, pass through and transcoding in accordance with the present invention may also occur on a macroblock level.

In some cases, even after picture pass through and slice pass through, there may be a significant number of macroblocks inside a picture that do not require transcoding. This proportion of compressed video data may be passed through to save computation cycles (as opposed to transcoding the data). In addition, macroblock pass trough 44 allows more flexible rate control without picture or slice boundary restrictions, thus providing a more balanced transcoding (e.g. quantization) and a more even picture quality.

Macroblock pass through 44 receives a signal from rate controller 29 that instructs which macroblocks to block copy from input buffer 24 to output buffer 32 and which macroblocks are sent to transcoding apparatus 26 for transcoding. Unlike picture and slice pass through, there are no synchronization bits for macroblocks. In other words, there are no defining points in the compressed bitstream for macroblocks boundaries.

To enable macroblock pass through, the present invention applies a series of steps to locate macroblocks boundaries and pass through compressed data based on the boundaries. Typically, a macroblock comprises motion vectors, mode info, and the DCT coefficients—the latter usually comprises about 90% of the data in a macroblock. For the first two components, pass through apparatus 30 applies a VLC decoding to obtain the motion vectors and mode info. The motion vectors and mode info are then block copied to output buffer 32.

Pass through apparatus 30 then pre-parses the data to count the number of bits of the DCT coefficients inside a macroblock. More specifically, each macroblock will have two macroblock boundaries whose positions need to be determined before block copying. The first macroblock boundary may be found using a pointer in the memory that is stored when a macroblock is first processed. To locate the second macroblock boundary, pass through apparatus 30 includes a parser or pre-parser that counts the number of bits in the macroblock to find the end of the macroblock. The end of the macroblock may be determined using the value of coded block patterns for the macroblock, as provided by the decoded mode info, in addition to the end of block (EOB) indicator. Once the total length of the DCT bits is obtained, the memory locations for the macroblock may be stored, and the DCT bits inside a macroblock may be directly copied from input buffer 24 to output buffer 32.

The present invention does not require pass-through apparatus 30 to know specific values of each DCT coefficient—only the number of bits of the DCT coefficients and length of the macroblock. Thus, pass-through apparatus 30 may implement algorithms and tools that expedite bit counting. In one embodiment, the present invention implements a look-up window to obtain and count the number of bits of several DCT coefficients at a single time. Instead of processing one DCT coefficient at a time, the look up window processes a window of W bits (where W is a number such as 15), which may include more than one DCT coefficients. A pre-designed lookup table is then used to determine how many valid DCT coefficients are contained in the window, and the size of each DCT coefficient, thus giving the number of valid DCT bits in the window. In this manner, multiple DCT coefficients may be counted in a single DCT decoding step.

If the data for a macroblock is not passed through, the DCT bits inside the macroblock are transcoded using transcoding apparatus 26. Rate controller 28 allocates the number of bits allowed per picture, slice, and macroblock, and thus determines whether a macroblock is passed through or transcoded. Rate controller 28 may adjust the amount of rate control to achieve a balance between more macroblock pass through, thereby achieving computational savings, and more even picture quality, achieved by less transcoding applied to more macroblocks. Typically, rate controller 28 knows the channel bandwidth available for transmitting the compressed data and makes decisions based on the available bandwidth and the bit rate required for the compressed data. Rate controller 28 may then compare the number of bits in a macroblock, for example, with the allowable channel bandwidth for transmitting the compressed video data.

In a specific embodiment, rate controller 28 compares the new quantization step size for the macroblock (as needed for bit rate reduction of the picture) with the old or original quantization step size for the macroblock. If the two are equal, then the macroblock is passed through. Alternately, if the new quantization step size is greater (it can not be less) than the original quantization step size, the macroblock is transcoded.

To avoid transcoding macroblocks that only require minimal rate reduction, e.g. rate reduction corresponding to a quantization step size difference of one or two, rate controller 28 may inlcude a threshold in the decision on whether to transcode a macroblock. For example, rate controller 28 may compare the new quantization step size with the sum of the old quantization step size and the threshold. If the new quantization step size is still larger than the sum of the old quantization step size and the threshold, than the macroblock is transcoded. However, if the new quantization step size is smaller or equal to the sum of the old quantization step size and the threshold, than the macroblock is passed through. In one embodiment, the threshold may correspond to a quantization step size in the range of 1 to 12. In a specific embodiment, the threshold may correspond to a quantization step size in the range of 1 to 4. Applying a threshold in this manner may be advantageous to avoid transcoding of macroblocks that only required minimum rate reduction.

Figure 4:
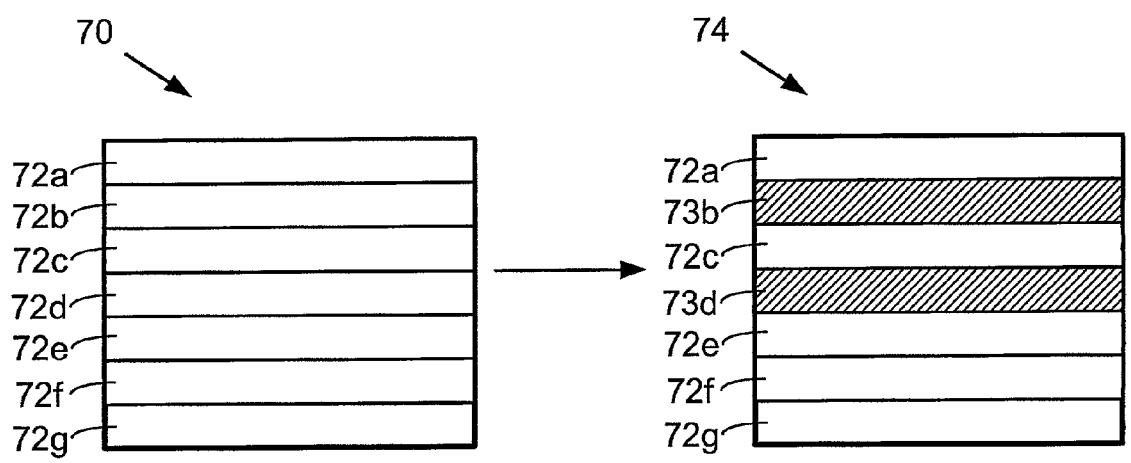
FIG. 4 illustrates the selected pass through of picture subregions on a slice level in accordance with the specific embodiment of the present invention.

FIG. 4 illustrates selected pass through of picture subregions on a slice level in accordance with a specific embodiment of the present invention. Video data 70 includes a number of slices 72a–g. As shown, network device 20 selectively passes through slices 72a, 72c, and 72e–72g; and transcodes slices 72b and 72d to form slices 73b and 73d. After processing, output video data 74 comprises a combination of slices block copied as received and transcoded slices that reduce the bit rate required to send video data 74.

Figure 5:
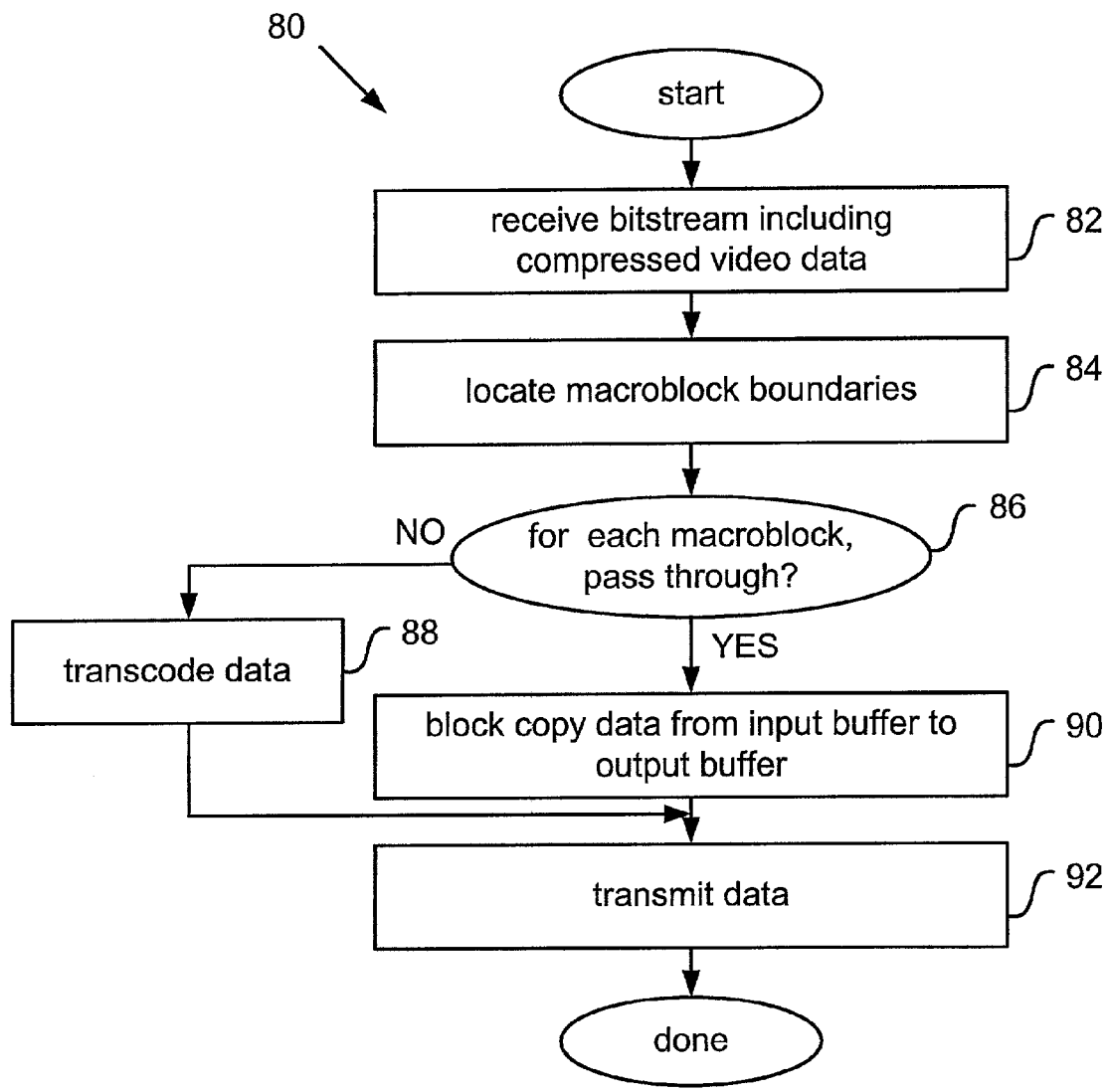
FIG. 5 illustrates a process flow for transmitting compressed video data onto a channel in accordance with one embodiment of the present invention.

FIG. 5 illustrates a process flow 80 for transmitting video data over a transmission channel in accordance with one embodiment of the present invention. Process flow 80 may take place in any network device such as the network device 20 of FIG. 1. Processes in accordance with the present invention may include up to several additional steps not described or illustrated here in order not to obscure the present invention. While pass through will now be described as a method, those skilled in the area will recognize that the present invention encompasses a system or software having units capable of performing the actions as described below.

Process flow 80 passes through and transcodes compressed data on a macroblock or picture basis. Process flow 80 begins by receiving a bitstream including compressed video data (82). For each picture that is not processed on a picture level, the macroblock boundaries are located (84). As mentioned before, this may include a parse or pre-parse of the compressed video data that counts the number of bits from the start of a macroblock boundary to the end of a macroblock boundary. The macroblock boundaries may then allow macroblock data in the compressed video data defined by macroblock boundaries to be block copied from an input buffer to an output buffer.

Selective pass through of each macroblock (86) may then be determined based on a comparison of the available channel bandwidth and the amount of data in the macroblock. This compared may be employed easily via the quantization step size, as described above. If the data is to be passed through, the data defined by the macroblock boundaries is then block copied from an input buffer to an output buffer (90). Alternately, the data in the compressed video data defined by the macroblock boundaries is transcoded (88). In a specific embodiment, this comprises re-quantization (see FIG. 6) at a quantization step size determined by the rate controller. The transcoded or passed through data may then be stored in a buffer until transmission onto a channel (92). The above steps (84–92) may then be repeated for each macroblock in the picture.

Macroblock passthrough according to process flow 80 may be used as a supplement to picture passthrough to handle portions of a picture that can not be handled by picture passthrough. In this case, the proposed method saves of computation cycles. The savings may derived from one or more of the following sources:

macroblock passthrough requires no re-quantization to DCT coefficients.

macroblock passthrough requires only partial decoding of the DCT coefficients and hence allows the use of fast multiple VLC table look-up for DCT coefficients decoding.

macroblock passthrough requires no VLC encoding for re-quantized DCT coefficients.

Compared with picture pass through methods applied alone, macroblock passthrough provided by the present invention provides finer pass through granularity hence allows more portions of the pictures that need no rate-reduction to be passed through. In addition, the present invention helps to produce more balanced transcoding, such as quantization, among pictures hence helps to reduce any beating effects. It should be noted that these gains in picture quality come without introducing significant processing requirements and reductions in transcoding speed.

Figure 6:
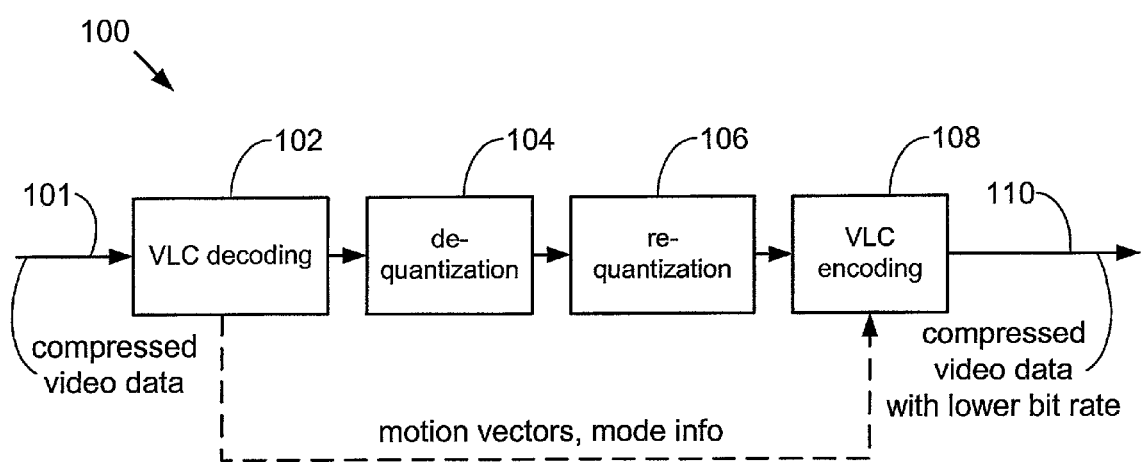
FIG. 6 illustrates a block diagram of the processing required for re-quantization scheme as performed by the transcoding apparatus of network device of FIG. 1.

FIG. 6 illustrates a block diagram of the processing required for re-quantization scheme 100 as performed by transcoding apparatus 26 of network device 20. Re-quantization 100 begins by receiving compressed video data (101). The video data is then re-encoded. As the term is used herein, re-encoding refers to the process of performing at least partial decoding and subsequent encoding on a compressed bitstream. Partial decoding of the video data includes VLC decoding 102 and de-quantization 104. Re-encoding then comprises re-quantization 106 and VLC encoding 108. For bit rate reduction of the video data, re-quantization 106 is performed with a larger quantization step value, as determined by the signal sent from rate controller 28. As one of skill in the art will appreciate, the exact quantization step value will depend on a number of factors such as the channel capacity, bit rate reduction ratio, picture type, original quantization step size, video resolution, general scene activity measures (e.g., a scene cut, fade, dissolves, wipes, rapid motion, panning), etc. The motion vectors and mode info are then encoded back into the compressed domain for transmission by the network device (110).

The techniques of the present invention may be implemented on various systems. For example, the invention may be implemented on network devices such routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. In another specific embodiment, the systems of this invention may be specially configured CMTSs such as, for example, specially configured models in the uBR-7200 series of CMTSs available from Cisco Systems. A general architecture for some of these machines will be given below. In an alternative embodiment, the methods of this invention may be implemented on a video streaming server, a cache server, a web server, or a general-purpose network host machine such as a personal computer or workstation. Further, the invention may be at least partially implemented on a card (e.g., an interface card) for a network device or a general-purpose computing device.

Figure 7:
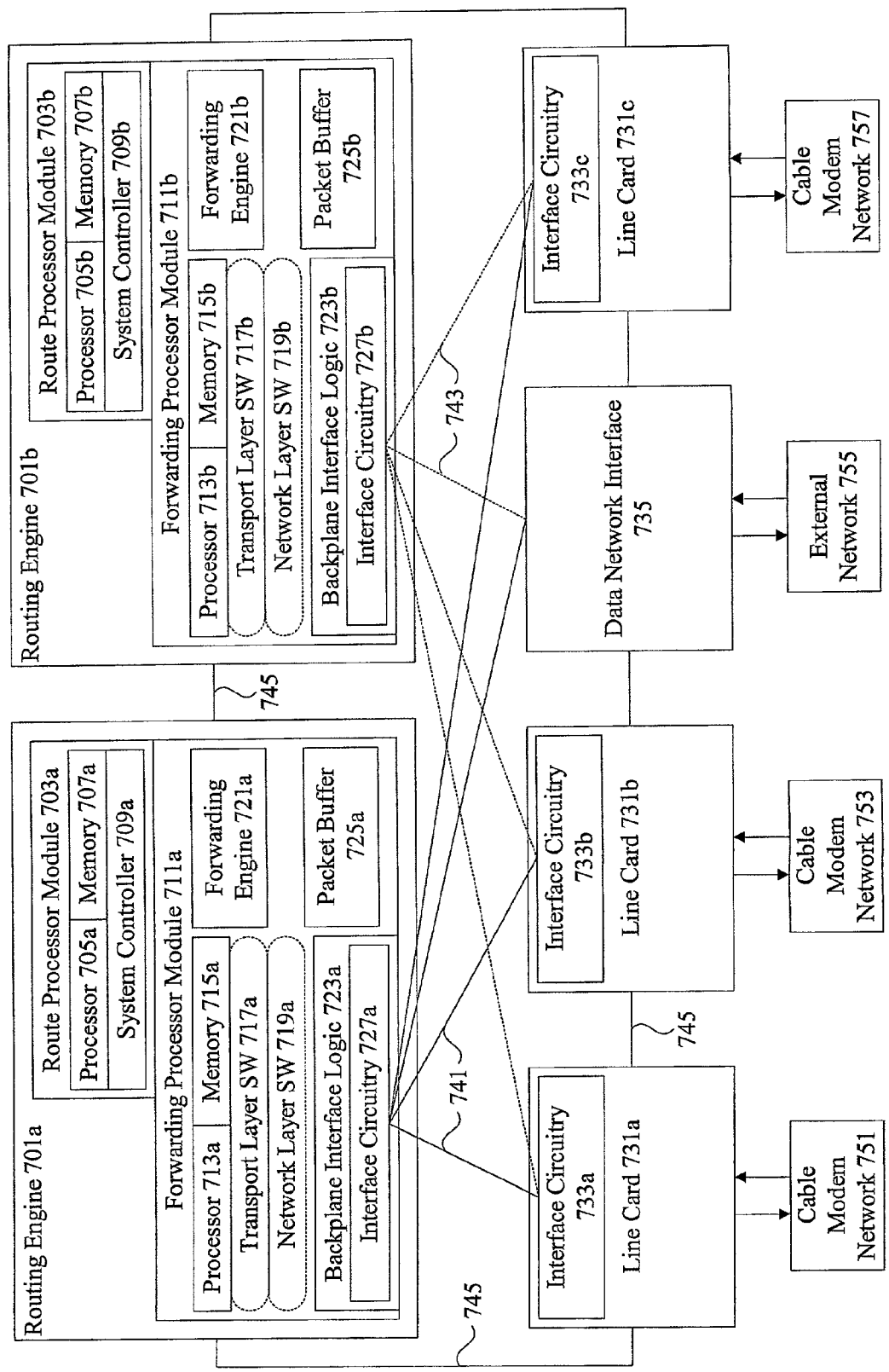
FIG. 7 is a block diagram of an exemplary router that may be used in conjunction with the methods of the present invention.

FIG. 7 shows a block diagram of a specific embodiment of a Cable Modem Termination System (CMTS) 700 which may be used to implement certain aspects of the present invention. As shown in FIG. 7, the CMTS 700 may comprise a plurality of routing engines (e.g. 701a, 701b).

Each of the routing engines may include a variety of similar modules and/or components. According to a specific embodiment, Routing Engine A may be configured or designed to include a plurality of functionally different modules or components, including, for example, a Forwarding Processor (FP) Module 711a adapted to provide packet forwarding functionality; a Route Processor (RP) Module 703a adapted to implement routing or forwarding operations; a utility component 702a adapted to provide system clock and timestamp functionality; etc. The routing engine components provide may be configured to provide layer one, layer two, layer three and layer four functionality as well as quality of service (QoS) functionality.

According to a specific implementation, the RP Module 703a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 7, the RP Module 703a comprises a general-purpose processor 705a (e.g., a MIPS route processor) coupled to a system controller 709a and memory 707a.

The memory 707a may comprise synchronous dynamic random access memory (SDRAM) storage locations addressable by the processor 705a for storing software programs, video data, and data structures accessed by the components. A network routing operating system, portions of which may reside in memory and executed by the route processor, functionally organizes the router by invoking network operations in support of software processes executing on the router.

The RP processor 705a may be configured to construct and load routing tables used by the FP Module 711a. The processor 705a may also be configured or designed to perform configuration management functions of the routing engine 701a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727a may be coupled to the respective interface circuitry 733a, 733b of line cards 731a, 731b. According to various embodiments, the FP Module 711 may comprise a processor 713a and memory 715a for handling transport layer 717 and network layer 719 functionality. The FP Module 711a may also be configured to provide transaction compacting functionality, data parcel tunneling functionality, video data transmission functionality, etc.

According to different embodiments of the present invention, one or more of the routing engines may be configured to communicate with a plurality of line cards (e.g. 731, 735) via point-to-point links. For example, as shown in FIG. 7, each of the plurality of line cards 731 and 735 are connected to each of the routing engines 701a, 701b via point-to-point links 741 and 743. One advantage of the point-to-point link configuration is that it provides additional reliability in that the failure of one or more line cards will not interfere with communications between other line cards and the routing engine(s). For example, if Line Card A 731a suddenly failed, each of the routing engines would still be able to communicate with the other line cards.

The techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Regardless of network device's configuration, it may employ one or more memories or memory modules (e.g., memory 707a, 715a, etc.) configured to store video data, program instructions for the network operations and other functions of the present invention described herein. The program instructions may specify an operating system and one or more applications, for example. Such memory or memories may also be configured to store data structures, video data, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the discussion to this point has focused on techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

One particular communication channel that is becoming increasingly common is the cable modem channel, such as that defined by the DOCSIS cable modem standard by CableLabs and the DAVIC cable modem standard by DVB. In DOCSIS based cable data networks, operators and digital service providers use the radio frequency spectrum in the coaxial cable network to deliver digital data signal in a 6 MHz frequency slot. The aggregate data bit rate capacity of the slot may be shared by multiple, possibly different, types of information services. Cable modem service is one such information service that allows service operators to provide a number of two-way interactive digital services to subscribers. One particular digital service delivers a compressed digital video signal for video streaming or video on demand.

Another particular communication channel that is becoming increasingly common is IP networks and Asynchronous Transfer Mode (ATM) networks. Both networks are based on different transport protocols which can be used to transport data or multimedia bitstreams with a pre-specified quality of service. For example, ATM protocol specifies how data is first packetized into fixed sized data units, called cells. It also specifies how such a cell stream can be multiplexed, de-multiplexed, switched and routed between different locations to support end-to-end connections at given bit rate and/or quality of service (QOS).

In another communication channel example, integrated services (IntServ), differential services (DiffServ), and Multiple Protocol Label Switch (MPLS) are used to establish a QOS for different network traffic. These services may use the Common Open Policy Service (COPS) for admission control. Internet Group Management Protocol (IGMP) and a variety of multicast routing protocols are also used to establish and tear down service on a multicast tree, which is commonly used for video transmission. In all these cases, the requested connection must provide the available bandwidth for the data being sent or the requested connection may either have to be rejected or a new set of admissible connection parameters may have to be negotiated.

While this invention has been described in terms of several preferred embodiments, there are alterations, permutations, and equivalents which fall within the scope of this invention which have been omitted for brevity's sake. For example, the present invention may be used to perform bandwidth sharing, despite the fact that the available bandwidth from the transmission facility, which includes but is not limited to, xDSL, ATM, wireless channel, is sufficient to send the input compressed bitstream. It is therefore intended that the scope of the invention should be determined with reference to the appended claims.

What is claimed is:

1. A network device for transmitting compressed video data onto a channel, the network device comprising:
   a processing apparatus designed or configured to locate macroblock boundaries in the compressed video data;
   a rate controller designed or configured to selectively pass through macroblock data in the compressed video data; and
   a transmitting network interface designed or configured to transmit the passed through macroblock data onto the channel.

2. The network device of claim 1 wherein the macroblock data comprises DCT coefficients included between the macroblock boundaries.

3. The network device of claim 1 wherein the processing apparatus is designed or configured to count the number of bits in a macroblock to locate the macroblock boundaries.

4. The network device of claim 1 further comprising a scheduler, operably coupled to the rate controller, and designed or configured to schedule packets including the compressed data.

5. The network device of claim 1 further comprising a transcoding apparatus, operably coupled to the rate controller, and designed or configured to transcode compressed video data.

6. The network device of claim 5 wherein the rate controller is further configured to output a control signal to the transcoding apparatus that determines the amount of rate reduction when transcoding the compressed video data using the transcoding apparatus.

7. The network device of claim 1 further comprising a receiving network interface designed or configured to receive a bitstream including the compressed video data.

8. The network device of claim 7 wherein the receiving network interface and the transmitting network interface are included in a combined network interface.

9. The network device of claim 7 further comprising an input buffer, operably coupled to the receiving network interface and operably coupled to the processing apparatus, that stores the passed through macroblock data.

10. The network device of claim 9 further comprising an output buffer, operably coupled to the transmitting network interface and operably coupled to the processing apparatus, that stores the passed through macroblock data before being provided to the transmitting network interface.

11. The network device of claim 10 wherein the network device copies the macroblock data selected for pass through from the input buffer to the output buffer.

12. A method for transmitting compressed video data over a channel, the method comprising:
    receiving a bitstream including the compressed video data;
    locating macroblock boundaries in the compressed video data;
    selectively passing through macroblock data in the compressed video data defined by the macroblock boundaries; and
    transmitting the passed through macroblock data onto the channel.

13. The method of claim 12 wherein locating the macroblock boundaries comprises parsing the compressed video data.

14. The method of claim 13 wherein locating the macroblock boundaries comprises counting the number of bits from the start of a macroblock to the end of a macroblock.

15. The method of claim 13 further comprising partial decoding of motion vectors and mode info included in a macroblock.

16. The method of claim 12 further comprising selectively passing through picture data in the compressed video data defined by picture boundaries.

17. The method of claim 12 wherein selectively passing through the macroblock data defined by the macroblock boundaries comprises block copying the macroblock data from an input buffer to an output buffer.

18. The method of claim 12 further comprising transcoding macroblocks that are not selectively passed through to produce compressed video data having a lower bit rate.

19. The method of claim 18 wherein the transcoding comprises re-quantization with a larger step size.

20. A network device for transmitting compressed video data onto a channel, the network device comprising:
   a processing apparatus designed or configured to locate picture subregion boundaries in the compressed video data;
   a rate controller designed or configured to selectively pass through picture subregions in the compressed video data; and
   transmitting the passed through picture subregions onto the channel.

21. A method for transmitting compressed video data over a channel, the method comprising:
   receiving a bitstream including the compressed video data;
   locating picture subregion boundaries in the compressed video data;
   selectively passing through picture subregions in the compressed video data; and
   a network interface designed or configured to the passed through picture subregions onto the channel.

22. The method of claim 21 wherein the video data is compressed according to an MPEG standard.

23. The method of claim 21 further comprising selectively passing through slice data in the compressed video data defined by slice boundaries.

24. A network device for transmitting compressed video data over a channel, the system comprising:
   means for receiving a bitstream including the compressed video data;
   means for locating macroblock boundaries in the compressed video data;
   means for selectively passing through macroblock data in the compressed video data defined by the macroblock boundaries; and
   means for transmitting the passed through macroblock data onto the channel.

25. The network device of claim 24 wherein means for locating the macroblock boundaries comprises means for parsing the compressed video data.

26. The network device of claim 24 other comprising means for transcoding the video data to produce compressed video data having a lower bit rate.

27. A computer readable medium including instructions for transmitting compressed video data over a channel, the instructions comprising:
   instructions for receiving a bitstream including the compressed video data;
   instructions for locating macroblock boundaries in the compressed video data;
   instructions for selectively passing through macroblock data in the compressed video data defined by the macroblock boundaries; and
   instructions for transmitting the passed through macroblock data onto the channel.

* * * * *